(12) United States Patent
Chang

(10) Patent No.: US 10,054,235 B2
(45) Date of Patent: Aug. 21, 2018

(54) CONTROL VALVE FOR FAUCET

(71) Applicant: Chia-Po Chang, Changhua (TW)

(72) Inventor: Chia-Po Chang, Changhua (TW)

(73) Assignee: Hain Yo Enterprises Co. Ltd., Changhua (TW)

( * ) Notice: Subject to any disclaimer, the term of this patent is extended or adjusted under 35 U.S.C. 154(b) by 58 days.

(21) Appl. No.: 15/171,770

(22) Filed: Jun. 2, 2016

(65) Prior Publication Data
US 2017/0350518 A1    Dec. 7, 2017

(51) Int. Cl.
| | | |
|---|---|---|
| F16K 11/085 | (2006.01) | |
| E03C 1/04 | (2006.01) | |
| E03C 1/02 | (2006.01) | |
| F16K 11/00 | (2006.01) | |
| G05D 23/13 | (2006.01) | |
| F16K 11/078 | (2006.01) | |

(52) U.S. Cl.
CPC .............. *F16K 11/085* (2013.01); *E03C 1/04* (2013.01); *E03C 2001/026* (2013.01); *F16K 11/00* (2013.01); *F16K 11/0787* (2013.01); *F16K 19/006* (2013.01); *G05D 23/13* (2013.01)

(58) Field of Classification Search
CPC .... F16K 11/00; F16K 11/085; F16K 11/0787; F16K 19/006; E03C 2001/026; G05D 23/13
See application file for complete search history.

(56) References Cited

U.S. PATENT DOCUMENTS

| | | | | |
|---|---|---|---|---|
| 7,363,934 B1* | 4/2008 | Lin | ......................... | F16K 11/074 137/315.13 |
| 8,707,995 B2* | 4/2014 | Yan | ........................... | F15D 1/04 137/100 |
| 2005/0126648 A1* | 6/2005 | Vu | ............................. | E03C 1/04 137/625.41 |
| 2010/0058534 A1* | 3/2010 | Martin | ................ | F16K 11/0787 4/677 |
| 2013/0087231 A1* | 4/2013 | Tung | ..................... | F16K 11/048 137/606 |
| 2013/0087232 A1* | 4/2013 | Tung | ..................... | F16K 11/048 137/625.17 |
| 2013/0199632 A1* | 8/2013 | Law | ....................... | F16K 11/044 137/511 |

(Continued)

*Primary Examiner* — Matthew W Jellett
*Assistant Examiner* — Christopher Ballman
(74) *Attorney, Agent, or Firm* — Che-Yang Chen; Law Offices of Scott Warmuth

(57) ABSTRACT

A control valve for faucet may comprise a control valve, a balancing valve, a water outlet unit, and a faucet body. A lower end of the control valve has a water inlet chamber and a water outlet chamber, and the balancing valve secured inside the water inlet chamber comprises a first shell and a second shell which are formed symmetrically and are configured to fit together to secure a pressure regulator therein. The water outlet unit secured inside the water outlet chamber has a first through hole, and a lower end thereof comprises a lower sealing ring which covers around a lower edge of the water outlet chamber. When control valve connected to the faucet body, the lower sealing ring only will be pressed downwardly instead of being twisted thereby reducing the possibility of damage or deformation and improving the strength of structure and the leakproof effect.

5 Claims, 5 Drawing Sheets

(56) References Cited

U.S. PATENT DOCUMENTS

| | | | |
|---|---|---|---|
| 2014/0124046 A1* | 5/2014 | Tung | G05D 23/1313 137/98 |
| 2015/0014423 A1* | 1/2015 | Yang | G05D 16/103 236/91 R |
| 2016/0083940 A1* | 3/2016 | Wang | F16K 47/04 137/625.4 |
| 2016/0341325 A1* | 11/2016 | Ye | F16K 19/006 |
| 2017/0168510 A1* | 6/2017 | Ye | G05D 23/1313 |

* cited by examiner

CONTROL VALVE FOR FAUCET

FIELD OF THE INVENTION

The present invention relates to a control valve and more particularly to a leakproof control valve for faucet.

BACKGROUND OF THE INVENTION

Generally, a conventional faucet comprises a control valve which is formed inside thereof and is configured to control the on/off operation of water flow and the mixing ratio of cold and hot water. Also, a shell covers around an outer periphery of the control valve and is secured on a faucet body by engaging a first threaded section of the shell with a second threaded section on the faucet body such that the control valve is secured and operated inside the faucet body.

However, conventional faucets are disadvantageous because the faucet body is connected with the shell by engaging the first threaded section with the second threaded section, and an O-ring is disposed therebetween thus achieving the leakproof effect between the control valve and faucet body. Nevertheless, when the shell is pressed by a user, a generated torque force may act on the O-ring which leads to the O-ring being twisted, deformed or further leads to breakage and leakage of the faucet. Moreover, when the leakage happened, the user needs to replace the O-ring which cannot definitely prevent the control valve from leakage again. In conclusion, the conventional faucet is insufficient in the strength of structure and the leakproof effect. Therefore, there remains a need for a new and improved design for a control valve for faucet to overcome the problems presented above.

SUMMARY OF THE INVENTION

The present invention provides a control valve for faucet which comprises a control valve, a balancing valve, a water outlet unit, and a faucet body. A stem body formed at a first end of the control valve is configured to control the mixing ratio of cold and hot water by selectively block water flow from a water inlet chamber or a water outlet chamber which are formed at a second end of the control valve. The balancing valve comprises a first shell and a second shell which are formed symmetrically and are configured to fit together to secure a pressure regulator inside the shells. The first shell and the second shell respectively have a cold water passageway and a hot water passageway which are respectively formed at two ends of the pressure regulator. Two upper O-rings are respectively disposed on an upper end of the cold water passageway and an upper end of the hot water passageway while two lower O-rings are respectively disposed on a lower end of the cold water passageway and a lower end of the hot water passageway. The balancing valve is secured in the water inlet chamber of the control valve, and the cold water passageway and the hot water passageway can be thoroughly separated by bearing the two upper O-rings against the water inlet chamber. The water outlet unit has a first through hole, and an upper end thereof has an upper sealing ring while a lower end thereof comprises a lower sealing ring. In addition, the water outlet unit is secured inside the water outlet chamber of the control valve, and the upper sealing ring is borne against an inner wall of the water outlet chamber to achieve the leakproof effect. Furthermore, the lower sealing ring is coupled with a lower edge of the water outlet chamber.

Wherein the faucet body has a housing chamber, and a bottom portion thereof comprises an outlet hole and an inlet hole. The control valve is inserted and secured inside the housing chamber through the second end thereof to allow the balancing valve to communicate with the inlet hole, and the lower O-rings are borne against an inner surface of the housing chamber thus preventing leakage. The water outlet unit is communicated with the outlet hole, and the lower sealing ring is borne against the inner surface of the housing chamber thereby achieving the leakproof effect.

Wherein an outer threaded section formed at an outer periphery of the housing chamber is configured to engage with a threaded portion of a cover. The cover further comprises a second through hole which is configured to allow the stem body to protrude therefrom when the cover is screwed on the faucet body. Since the cover is screwed downwardly on the faucet body, the control valve secured therebetween is pressed downwardly to allow the lower O-rings and the lower sealing ring to tightly bear against the inner surface of the housing chamber.

Wherein a flange protrudes from an outer periphery of a lower end of the water outlet unit, and a lower end of the balancing valve has a locating ring protruding from an outer periphery thereof. Moreover, the flange and the locating ring are secured between the control valve and the faucet body.

Wherein a tip portion protrudes from an edge of the flange of the water outlet unit, and a recessed portion formed on the locating ring of the balancing valve is configured to receive the tip portion such that the water outlet unit and the balancing valve are configured to couple with each other and be firmly received in the control valve.

Wherein a tube body is secured inside the balancing valve, and a plurality of elastic units are disposed on a surface of the tube body. The elastic units bearing against an inner periphery of the balancing valve are configured to achieve the leakproof effect. Moreover, the tube body is configured to allow the pressure regulator to smooth slide therein.

Comparing with conventional control valve, the present invention is advantageous because: (i) the control valve has a water outlet chamber which further comprises a water outlet unit, and the first through hole vertically penetrates the water outlet unit. The lower sealing ring is disposed on a lower end of the first through hole to couple with and cover around the lower edge of the water outlet chamber, and, meanwhile, the lower sealing ring is borne against an outer periphery of the outlet hole of the faucet body. As a result, when the cover is screwed and secured on the faucet body, the lower sealing ring only will be pressed downwardly instead of being twisted thereby reducing the possibility of damage or deformation of the lower sealing ring and improving the strength of structure and the leakproof effect; (ii) since the flange, which protrudes from the outer periphery of the lower end of the water outlet unit, and the locating ring, which protrudes from the outer periphery of the lower end of the balancing valve, are coupled between the control valve and the faucet body, the down force from the cover can be evenly dispersed on the lower O-rings and the lower sealing ring thus efficiently preventing leakage; and (iii) the flange of the water outlet unit further has a tip portion, and the locating ring of the balancing valve comprises the recessed portion which is configured to receive the tip portion such that the water outlet unit and the balancing valve are configured to couple with each other and be firmly received in the control valve thereby improving the convenience of assembly.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
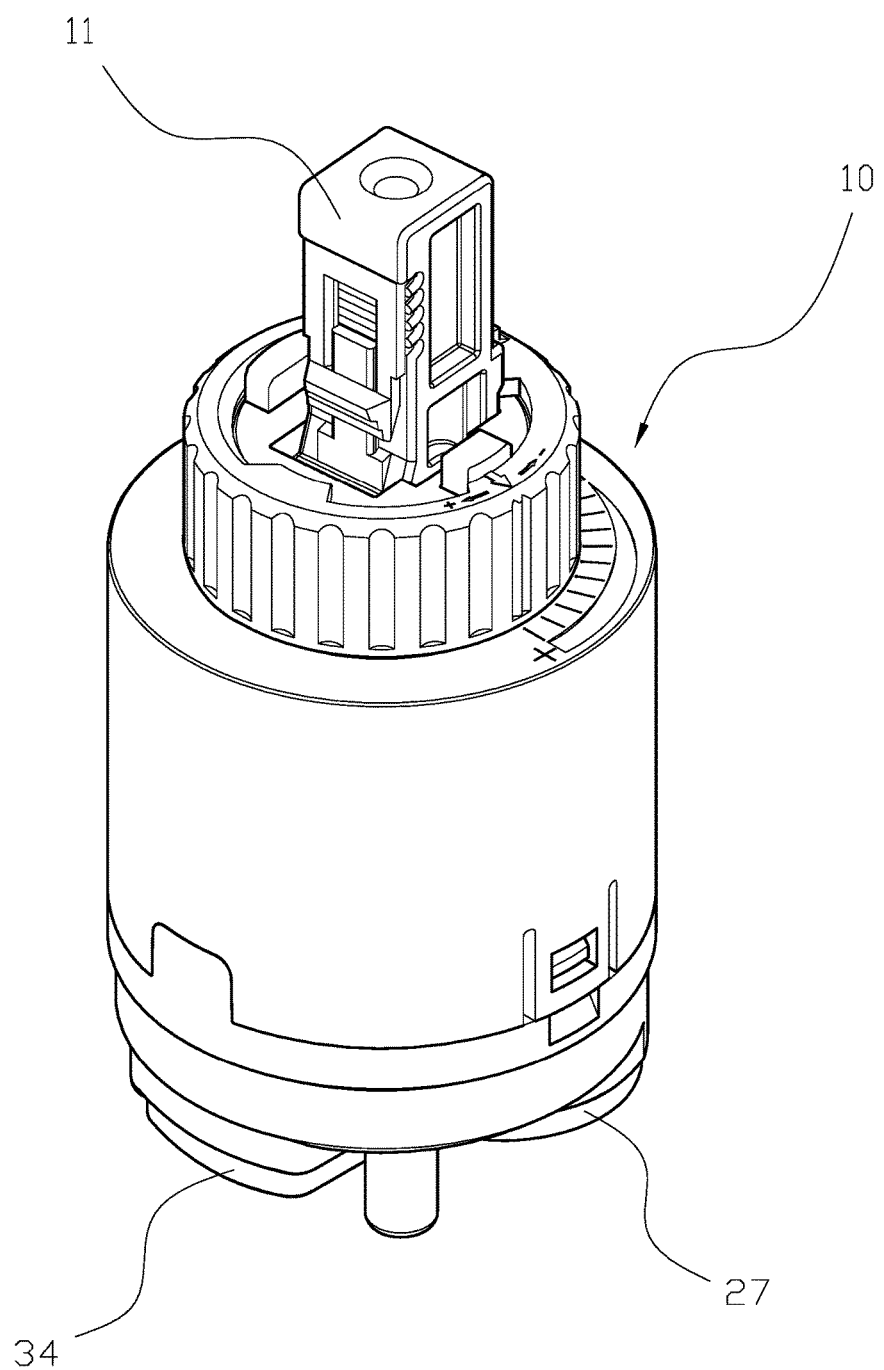
FIG. 1 is a three-dimensional view of a control valve for faucet in the present invention.
Figure 2:
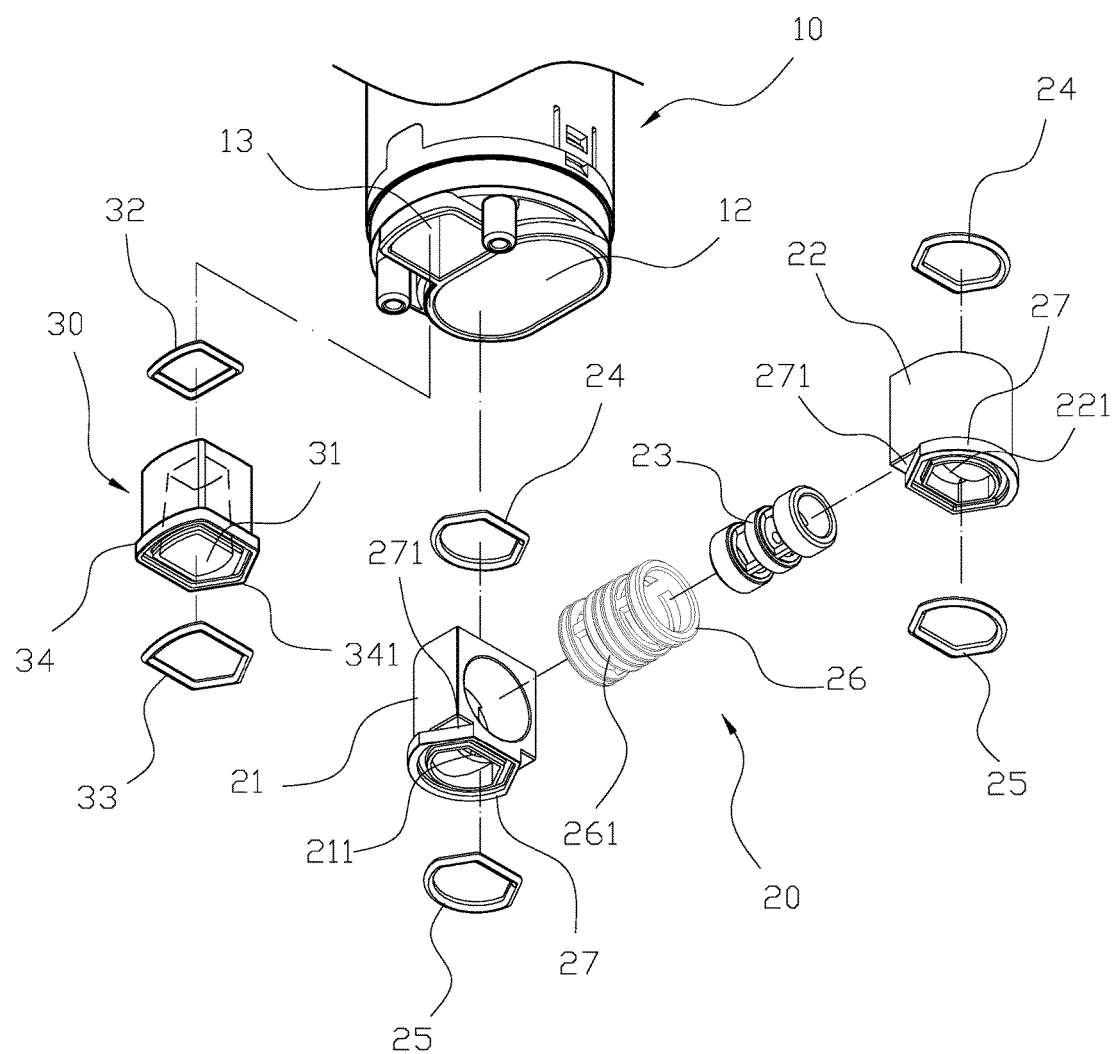
FIG. 2 is a three-dimensional exploded view of the control valve for faucet in the present invention.
Figure 3:
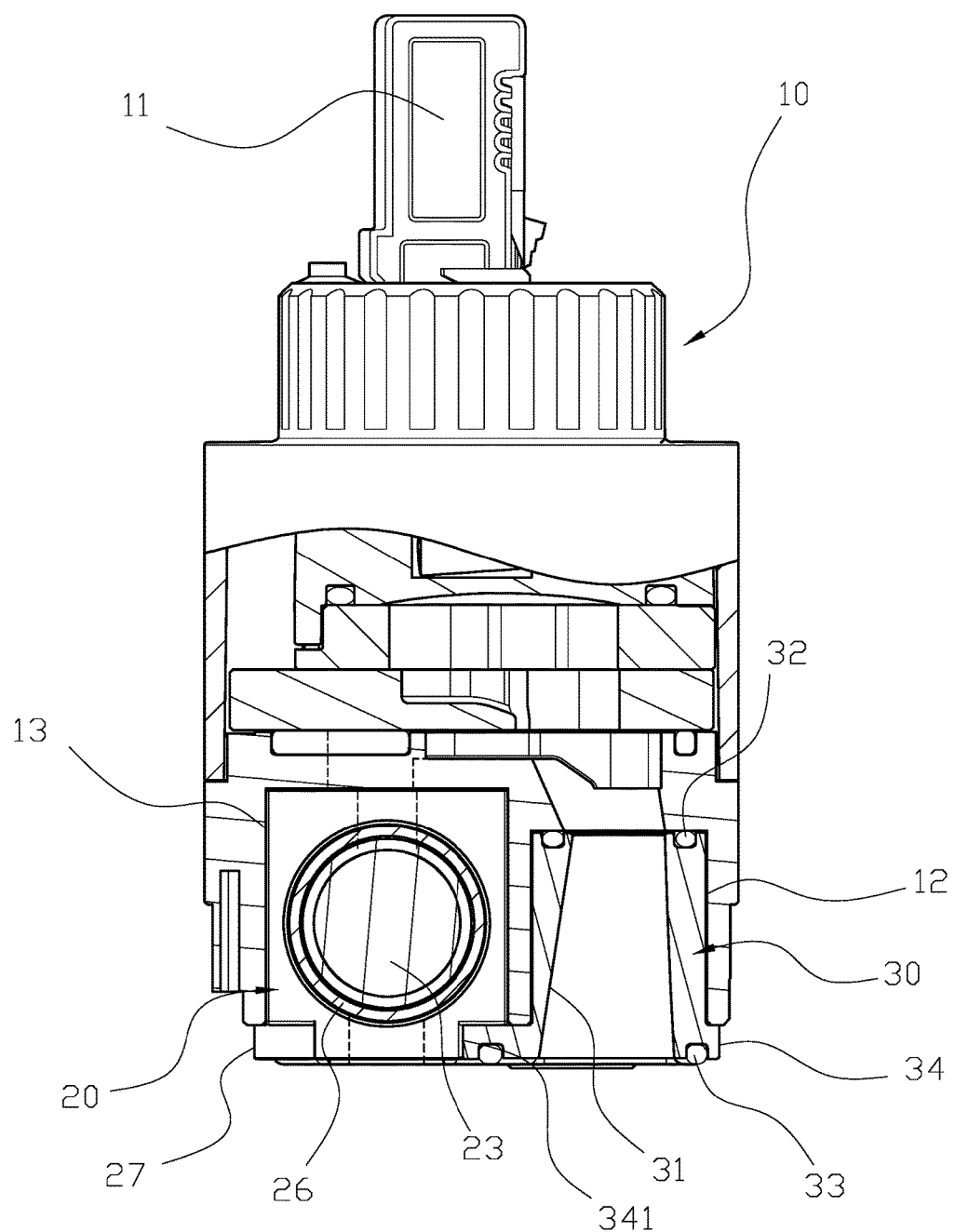
FIG. 3 is a sectional view of the control valve for faucet in the present invention.
Figure 4:
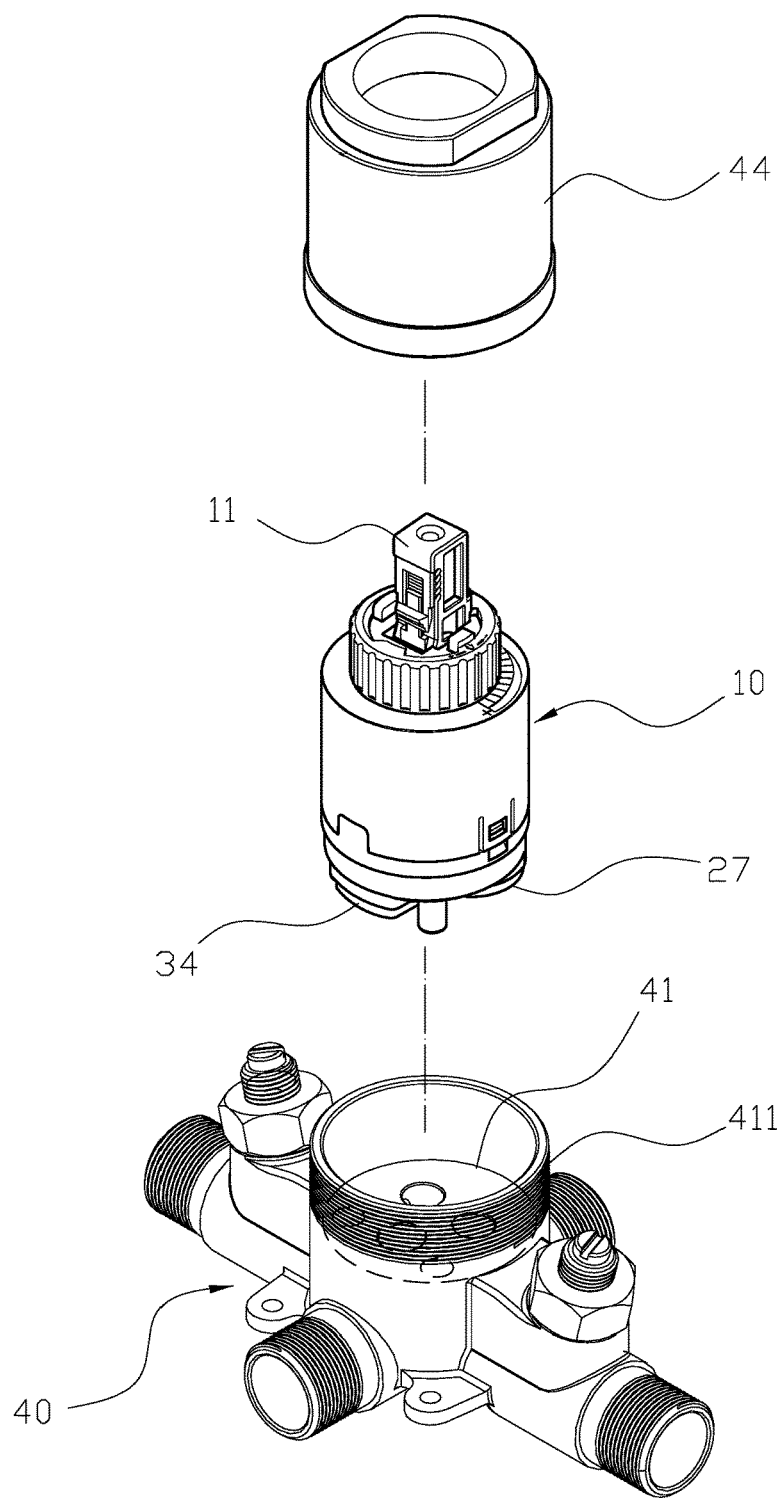
FIG. 4 is a first schematic view illustrating the control valve for faucet in the present invention is in use.
Figure 5:
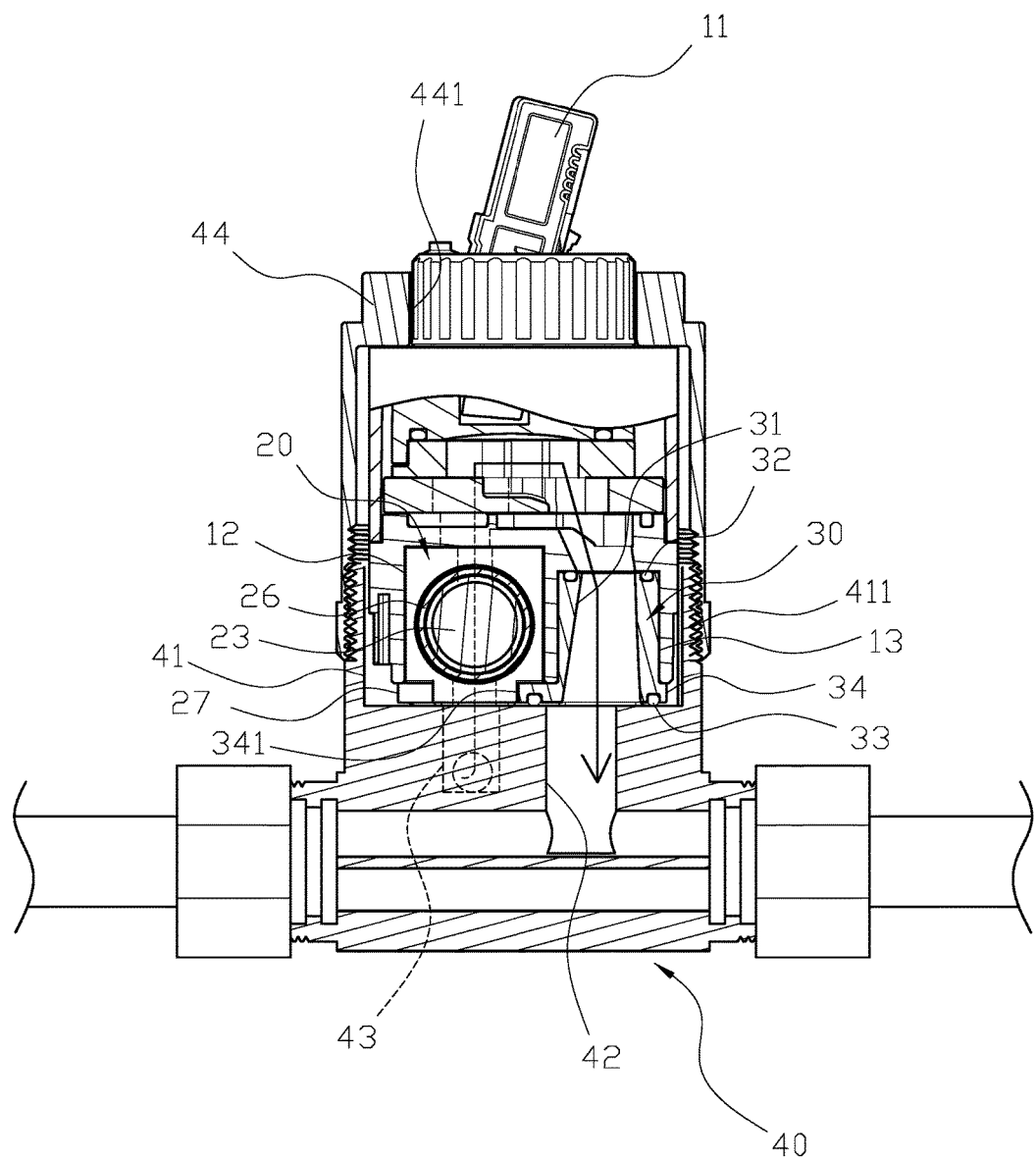
FIG. 5 is a second schematic view illustrating the control valve for faucet in the present invention is in use.

In order to further understand the goal, characteristics and effect of the present invention, a number of embodiments along with the drawings are illustrated as following:

Referring to FIGS. 1 to 5, the present invention provides a control valve for a faucet which comprises a control valve (10), a balancing valve (20), a water outlet unit (30), and a faucet body (40). A stem body (11) formed at a first end of the control valve (10) is configured to control the mixing ratio of cold and hot water by selectively block water flow from a water inlet chamber (12) or a water outlet chamber (13) which are formed at a second end of the control valve (10). The balancing valve (20) comprises a first shell (21) and a second shell (22) which are formed symmetrically and are configured to fit together to secure a pressure regulator (23) inside the shells (21)(22). The first shell (21) and the second shell (22) respectively have a cold water passageway (211) and a hot water passageway (221) which are respectively formed at two ends of the pressure regulator (23). Two upper O-rings (24) are respectively disposed on an upper end of the cold water passageway (211) and an upper end of the hot water passageway (221) while two lower O-rings (25) are respectively disposed on a lower end of the cold water passageway (211) and a lower end of the hot water passageway (221). The balancing valve (20) is secured in the water inlet chamber (12) of the control valve (10), and the cold water passageway (211) and the hot water passageway (221) can be thoroughly separated by bearing the two upper O-rings (24) against the water inlet chamber (12). Also, a tube body (26) is secured inside the balancing valve (20), and a plurality of elastic units (261) are disposed on a surface of the tube body (26). The elastic units (261) bearing against an inner periphery of the balancing valve (20) are configured to achieve the leakproof effect. Moreover, the tube body (26) is configured to allow the pressure regulator (23) to smooth slide therein. The water outlet unit (30) has a first through hole (31), and an upper end thereof has an upper sealing ring (32) while a lower end thereof comprises a lower sealing ring (33). In addition, the water outlet unit (30) is secured inside the water outlet chamber (13) of the control valve (10), and the upper sealing ring (32) is borne against an inner wall of the water outlet chamber (13) to achieve the leakproof effect. Furthermore, the lower sealing ring (33) is coupled with a lower edge of the water outlet chamber (13) to achieve the leakproof effect and to improve the stability of the installation. The faucet body (40) has a housing chamber (41), and a bottom portion thereof comprises an outlet hole (42) and an inlet hole (43). The control valve (10) is inserted and secured inside the housing chamber (41) through the second end thereof to allow the balancing valve (20) to communicate with the inlet hole (43), and the lower O-rings (25) are borne against an inner surface of the housing chamber (41) thus preventing leakage. The water outlet unit (30) is communicated with the outlet hole (42), and the lower sealing ring (33) is borne against the inner surface of the housing chamber (41) thereby achieving the leakproof effect. An outer threaded section (411) formed at an outer periphery of the housing chamber (41) is configured to engage with a threaded portion of a cover (44). The cover (44) further comprises a second through hole (441) which is configured to allow the stem body (11) to protrude therefrom when the cover (44) is screwed on the faucet body (40). Since the cover (44) is screwed downwardly on the faucet body (40), the control valve (10) secured therebetween is pressed downwardly to allow the lower O-rings (25) and the lower sealing ring (33) to tightly bear against the inner surface of the housing chamber (41). A flange (34) protrudes from an outer periphery of a lower end of the water outlet unit (30), and a lower end of the balancing valve (20) has a locating ring (27) protruding from an outer periphery thereof. Moreover, the flange (34) and the locating ring (27) are secured between the control valve (10) and the faucet body (40). In addition, a tip portion (341) protrudes from an edge of the flange (34) of the water outlet unit (30), and a recessed portion (271) formed on the locating ring (27) of the balancing valve (20) is configured to receive the tip portion (341) such that the water outlet unit and the balancing valve are configured to couple with each other and be firmly received in the control valve thereby improving the convenience of assembly.

Structurally, referring to FIGS. 1 to 5, the pressure regulator (23) is secured and functional inside the tube body (26) of the balancing valve (20), and the first shell (21) and the second shell (22) are fit together and cover around the tube body (26). The two upper O-rings (24) are respectively disposed on the upper end of the cold water passageway (211) and the upper end of the hot water passageway (221) while the two lower O-rings (25) are respectively disposed on the lower end of the cold water passageway (211) and the lower end of the hot water passageway (221). The balancing valve (20) is secured in the water inlet chamber (12) of the control valve (10), and the two upper O-rings (24) are borne against the control valve (10) thus preventing leakage. In the meantime, the locating ring (27) of the balancing valve (20) is borne against an outer edge of the control valve (10). The water outlet unit (30) has the first through hole (31), and the upper sealing ring (32) is disposed on the upper end of the first through hole (31) while the lower sealing ring (33) is disposed on the lower end thereof. The water outlet unit (30) is secured inside the water outlet chamber (13) of the control valve (10), and the upper sealing ring (32) is borne against both the control valve (10) and the water outlet unit (30) thereby achieving the leakproof effect therebetween. Wherein the flange (34) of the water outlet unit (30) is also borne against the outer edge of the control valve (10), and the tip portion (341) of the flange (34) is received in the recessed portion (271) of the balancing valve (20). Furthermore, a position of the balancing valve (20) is secured by bearing the tip portion (341) against the first shell (21) and the second shell (22) to prevent the water inlet chamber (12) from falling down during the installation process and to improve the strength of structure. In actual application, the control valve (10) is secured inside the housing chamber (41) of the faucet body (40) to allow the balancing valve (20) to communicate with the inlet hole (43), and the lower O-rings (25) are borne against the bottom portion of the housing chamber (41). The water outlet unit (30) is communicated with the outlet hole (42), and the lower sealing ring (33) is also borne against the bottom portion of the housing chamber (41). The upper O-rings (24) and the lower sealing ring (33) can prevent leakage between the control valve (10) and the faucet body (40). Moreover, the cover (44) is screwed and secured on the faucet body (40) through the outer threaded section (411), and the cover (44) further has the second through hole (441) to allow the stem body (11) of the control valve (10) to stick out of the cover (44). The user can operate the stem body (11) to allow the balancing valve (20) located inside the water inlet chamber (12) to communicated with the water outlet unit (30) located inside the water outlet chamber (13), and thus the cold and hot water from the inlet hole (43) can flow through the pressure regulator (23) to allow high-pressure fluid to be reduced to safe usable pressure, and flows through the control valve (10), the first through hole (31) of the water outlet unit (30) and out of faucet body (40) through the outlet hole (42) thereby allowing the cold and hot water to be well-mixed before flowing out of the faucet.

Comparing with conventional control valve, the present invention is advantageous because: (i) the control valve (10) has a water outlet chamber (13) which further comprises a water outlet unit (30), and the first through hole (31) vertically penetrates the water outlet unit (30). The lower sealing ring (33) is disposed on a lower end of the first through hole (31) to couple with and cover around the lower edge of the water outlet chamber (13), and, meanwhile, the lower sealing ring (33) is borne against an outer periphery of the outlet hole (42) of the faucet body (40). As a result, when the cover (44) is screwed and secured on the faucet body (40), the lower sealing ring (33) only will be pressed downwardly instead of being twisted thereby reducing the possibility of damage or deformation of the lower sealing ring (33) and improving the strength of structure and the leakproof effect; (ii) since the flange (34), which protrudes from the outer periphery of the lower end of the water outlet unit (30), and the locating ring (27), which protrudes from the outer periphery of the lower end of the balancing valve (20), are coupled between the control valve (10) and the faucet body (40), the down force from the cover (44) can be evenly dispersed on the lower O-rings (25) and the lower sealing ring (33) thus efficiently preventing leakage; and (iii) the flange (34) of the water outlet unit (30) further has a tip portion (341), and the locating ring (27) of the balancing valve (20) comprises the recessed portion (271) which is configured to receive the tip portion (341) such that the water outlet unit and the balancing valve are configured to couple with each other and be firmly received in the control valve thereby improving the convenience of assembly.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A control valve for a faucet comprising:
    a control valve having a stem body which is formed at a first end thereof and is configured to control the mixing ratio of cold and hot water, and a second end of the control valve comprising a water inlet chamber and a water outlet chamber which are selectively blocked or unblocked by operating the stem body;
    a balancing valve comprising a first shell and a second shell which are formed symmetrically and configured to fit together to secure a pressure regulator therein, the first shell and the second shell respectively having a cold water passageway and a hot water passageway which are separated and respectively formed at two ends of the pressure regulator, two upper O-rings respectively disposed on an upper end of the cold water passageway and an upper end of the hot water passageway while two lower O-rings respectively disposed on a lower end of the cold water passageway and a lower end of the hot water passageway, the balancing valve secured in the water inlet chamber of the control valve, and the two upper O-rings borne against an inner wall of the water inlet chamber to separate the cold water passageway and the hot water passageway; and
    a water outlet unit comprising a first through hole, and an upper sealing ring and a lower sealing ring respectively disposed on an upper end and a lower end thereof, the water outlet unit secured inside the water outlet chamber of the control valve, and the upper sealing ring borne against an inner wall of the water outlet chamber to achieve the leakproof effect, and the lower sealing ring covering around a lower edge of the water outlet chamber,
    wherein the lower sealing ring is borne against an outer periphery of the outlet hole of the faucet body, and when the cover is screwed and secured on the faucet body, the lower sealing ring is configured to be pressed downwardly instead of being twisted to reduce damage or deformation of the lower sealing ring to enhance a leakproof effect,
    wherein a pentagonal flange protrudes from an outer periphery of a lower end of the water outlet unit, and a lower end of the balancing valve has a locating ring protruding from an outer periphery thereof, and the flange and the locating ring are secured between the control valve and the faucet body.

2. The control valve for faucet of claim 1, wherein the control valve is configured to connect to a faucet body which comprises a housing chamber, and a bottom portion thereof has an outlet hole and an inlet hole, and the control valve is inserted and secured inside the housing chamber through the second end thereof to allow the balancing valve and the water outlet unit to respectively communicate with the inlet hole and the outlet hole, and the lower O-rings and the lower sealing ring are borne against an inner surface of the housing chamber thereby preventing leakage.

3. The control valve for faucet of claim 2, wherein an outer periphery of the housing chamber has an outer threaded section which is configured to screw a cover on, and the cover further comprises a second through hole to allow the stem body of the control valve to protrude therefrom when the cover is screwed on the faucet body, and the control valve is secured between the cover and the faucet body, and the lower O-rings and the lower sealing ring are tightly borne against the inner surface of the housing chamber.

4. The control valve for faucet of claim 1, wherein a tip portion protrudes from an edge of the pentagonal flange of the water outlet unit, and a recessed portion formed on the locating ring of the balancing valve is configured to receive the tip portion such that the water outlet unit and the balancing valve are configured to couple with each other and be firmly received in the control valve.

5. The control valve for faucet of claim 1, wherein a tube body is secured inside the balancing valve and is configured to allow the pressure regulator to smooth slide therein, and a plurality of elastic units disposed on a surface of the tube body is configured to bear against an inner periphery of the balancing valve.

* * * * *